US007337035B2

(12) United States Patent
Müller et al.

(10) Patent No.: US 7,337,035 B2
(45) Date of Patent: Feb. 26, 2008

(54) METHOD FOR CARRYING OUT A PRINTING CORRECTION AND APPARATUS FOR DOING THIS

(75) Inventors: Christoph Müller, Lohr am Main (DE); Stephan Schultze, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 11/359,701

(22) Filed: Feb. 21, 2006

(65) Prior Publication Data

US 2006/0271230 A1 Nov. 30, 2006

(30) Foreign Application Priority Data

Feb. 18, 2005 (DE) ...................... 10 2005 007 435

(51) Int. Cl.
*G05D 11/00* (2006.01)

(52) U.S. Cl. ...................................... 700/125; 700/127

(58) Field of Classification Search ........ 700/122-125, 700/127, 128
See application file for complete search history.

(56) References Cited

U.S. PATENT DOCUMENTS 3,963,902 A * 6/1976 Dowd ......................... 377/17
4,366,542 A * 12/1982 Anselrode ................... 700/125
4,528,630 A * 7/1985 Sargent ...................... 700/125
5,117,365 A * 5/1992 Jeschke et al. ............. 700/124
5,209,161 A * 5/1993 Derivi et al. ............... 101/211
5,327,826 A * 7/1994 Rodi .......................... 101/181
6,167,806 B1 * 1/2001 Chretinat et al. ........... 101/220
6,499,397 B2 * 12/2002 Stern .......................... 101/248
6,591,746 B2 * 7/2003 Siler .......................... 101/171
6,647,874 B1 * 11/2003 Siegl et al. ................. 101/211

* cited by examiner

*Primary Examiner*—Kidest Bahta
*Assistant Examiner*—Chad Rapp
(74) *Attorney, Agent, or Firm*—Kenyon & Kenyon LLP

(57) ABSTRACT

A method for carrying out a printing correction and a device for this. A method for carrying out a printing correction is provided, a product being printed on during a processing procedure by a plurality of processing devices, positions of two printing marks A,B,C,D being recorded. The positions of the printing marks A,B,C,D are evaluated and an automated correction of the print is carried out in the light of the positions of the printing marks A,B,C,D, the correcting including a correcting of a printing length. Furthermore, an apparatus is provided for carrying out the method.

14 Claims, 7 Drawing Sheets

METHOD FOR CARRYING OUT A PRINTING CORRECTION AND APPARATUS FOR DOING THIS

FIELD OF THE INVENTION

The present invention relates to a method for carrying out a printing correction.

BACKGROUND INFORMATION

In the printing field, there is a widespread use of flexible production masters these days. These are tautly mounted on the plate cylinder, an extension of the production master being able to occur because of the mounting of the production masters on the plate cylinders. From this, there follows a variable production master length which disadvantageously results in a variable print length. This is the case, for example, for flexographic printing plates, which are designed to be flexible and stretchable in a rubber-like manner, so that unknown printing lengths result because of the mounting of the flexographic printing plate on the plate cylinder.

Furthermore, independently of the height of a printing plate, the mounting length is the same for all printing plates, so that different roll-over lengths are able to come about for the individual printing plates because of the different printing plate heights. The same condition obtains if the processing masters are prepared in an insufficiently accurate manner, or are subjected to fluctuations in the preparation. An examination of this effect is described, for instance, in the article, "Printing Length Adjustment in Corrugated Paper Direct Printing", in the journal Flexoprint of April 2001.

Furthermore, in the case of the occasional printing carrier, it may happen that there is a change in the size of the printing carrier between individual processing procedures, on account of a moisture input or a drying procedure.

Because of the previously discussed variable printing lengths or sizes of the printing carriers, during the course of a printing procedure it may also happen, disadvantageously, that variable printing lengths result for the individual working masters. One result of this are register-inaccurate printing processes for the individual processing masters, and consequently blotted appearances of the overall prints.

It is known that the variable master lengths described are manually corrected. For this purpose, the actual printing lengths of the individual working masters are individually measured on the printed sheets. From these printing lengths for the individual working masters correction values are determined, and these are entered manually into a printing device. It is a disadvantage that this results in complicated and awkward handling, which delays the processing procedure in an undesired manner because it is time-consuming. For a plurality of plate cylinders, whose printing lengths are corrected manually, a disadvantageously high additional processing expenditure may be created.

In the related art it is moreover known that, using a so-called register control function, one may use so-called register marks of various production masters in order to align various part printings with respect to position. For example, from DE 102 41 609 a method and a device are known for determining and correcting an imperfect register.

SUMMARY OF THE INVENTION

It is the object of the present invention to make available a method and a device for an improved printing correction.

The method according to the present invention is provided for carrying out a printing correction, a product being printed on by a plurality of processing devices during a processing procedure. The method includes the following method steps:

recording the positions of at least two printing marks situated on the product;

evaluating the marks; and correcting the print in automated fashion in light of the positions of the printing marks, the correcting including the correcting of a printing length.

Advantageously, this supports the automated carrying out of a printing correction, the correction including the correction of a printing length. Consequently, the printing correction principles known in the related art may be used in an improved manner. Advantageously, for instance, one is able to minimize set-up times for production masters. Thus the efficiency of a printing procedure may be favorably increased.

One preferred specific embodiment of the method according to the present invention provides that, in addition to the correction of the printing length, a correction of the printing position is carried out too. Thereby printing marks on the printing product can be controlled with respect to position, which supports an improved alignment of individual prints and consequently improves a quality of a printing procedure even more.

An additional preferred specific embodiment of the method according to the present invention provides that at least one first printing mark is situated in an area in front of the printing product in the direction of transportation, and at least one second printing mark is situated in an area in the rear of the printing product in the direction of transportation.

This advantageously utilizes a maximal area of the printing product for measuring the actual printing length for the subsequent correction of the unequal length of the masters of different processing devices.

An additional preferred specific embodiment of the method according to the present invention provides that, during the processing procedure, only a first of several processing devices applies both the printing marks. Thereby it may be achieved that, in the processing procedure, processing devices adjust their printing, with respect to position, to the printing of the first processing device. In this manner, therefore, a position correction of the printing is achieved with the aid of which long-term drifts may be permanently eliminated from the printing process. The stability of the printing procedure is increased advantageously thereby.

DETAILED DESCRIPTION

Figure 1:
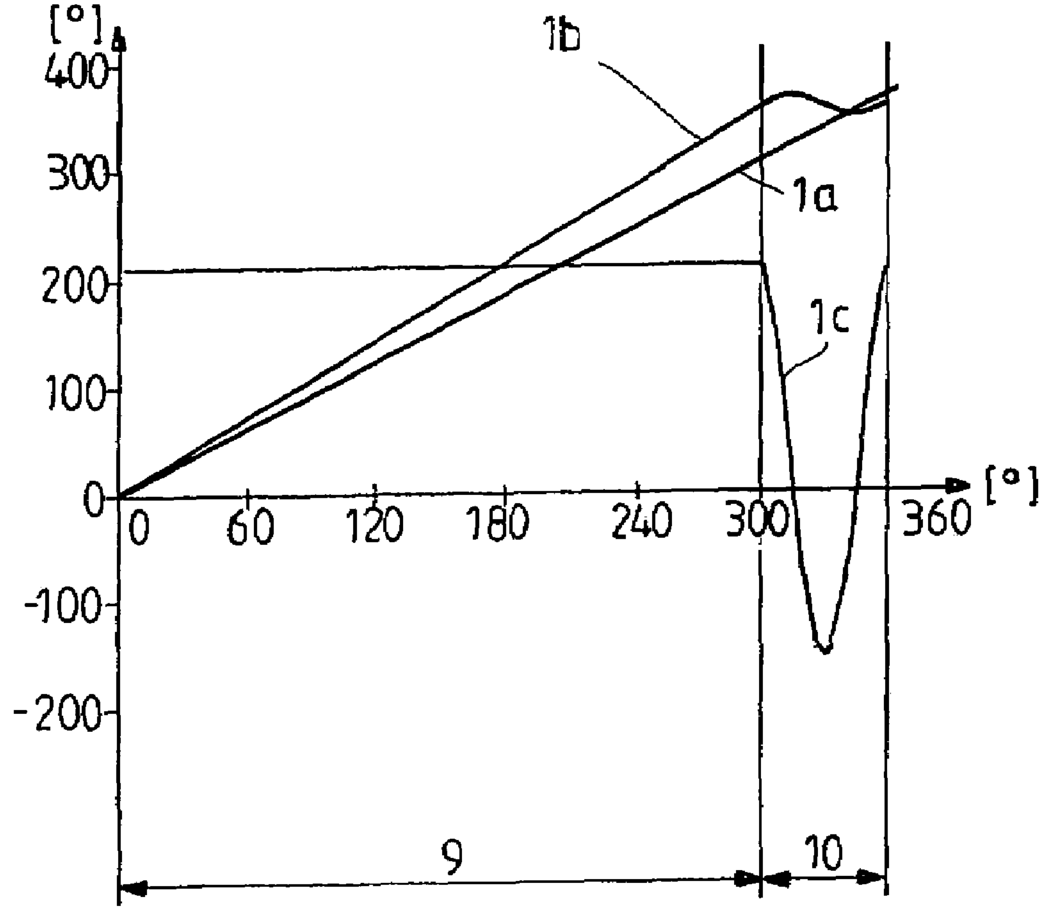
FIG. 1 shows a representation in principle of a printing correction according to the present invention.

In the light of a diagram, FIG. 1 shows a representation in principle of a print correction according to the present invention. In the diagram, on the x axis, a machine angle (for instance, a working angle of an impression cylinder) of a printing device is plotted. On the y axis, an angle of a plate cylinder of the printing device is plotted. An area 1 on the x axis defines a printing area, and an area 2 on the x axis defines a printing-free zone of the printing device, that is, an area of the printing device in which no printing on the printing product is carried out. An essentially linear course 1*a* represents an uncorrected curve of the machine angle plotted against the angle of the plate cylinder. In this area, the two angles run synchronously to each other, so that thereby identical speeds of a printing product and of a plate cylinder having a mounted printing plate are attained. This may be seen in the diagram in that the impression cylinder has executed a complete revolution (360°) at the same time as the plate cylinder.

A curve 1*b* is a curve representing the machine angle corrected for printing length plotted against the angle of the plate cylinder. Curve 1*b* is steeper than curve 1*a*, and thus, the plate cylinder achieves a full rotation earlier than the impression cylinder. FIG. 1 shows that the plate cylinder has performed approximately one full rotation (from 0° to 360°) at a point in time at which the impression cylinder has rotated only from 0° to 300°. This means that, because of the mounted flexographic printing plate, the plate cylinder rotates at a higher angular speed that an axle of the printing device which drives the impression cylinder. As a result of this different angular speed, a relative motion develops between the plate cylinder having the mounted flexographic printing plate and the printing product. It is true that, because of this, an increased wear of the printing plate is created by friction, but on the other hand the printing area (area 1) of the printing product is advantageously completely filled in because of the printing length of the flexographic printing plate.

In area 2 of FIG. 1, a speed curve of a correction motion of the plate cylinder is shown as curve 1*c*. In this area, the plate cylinder having the printing plate is position-corrected in such a way that, at the beginning of the next printing area at 360° or 0°, in common with the impression cylinder, it takes up again a specified common position. It is shown in FIG. 1 that the plate cylinder executes a braking motion in the printing-free zone (negative slope of the S curve). This has the result that the speed curve of the correction motion of the plate cylinder briefly goes into negative territory, that, in fact, plate cylinder and impression cylinder briefly have opposite angular speeds. Normally, however, the speed curve remains completely in positive territory, which means that the angular speed of the plate cylinder has the same sign as the angular speed of the impression cylinder.

The correction of the imperfect register of a printing length, shown in principle in FIG. 1, is known in the related art as the APM function (anti-print enlargement mode), and it is able to be carried out advantageously in automated fashion by the method according to the present information. This means that a correction of the printing procedure on account of different printing lengths, which usually represents a relatively costly and awkward procedure, and essentially requires laborious and time-consuming manual work of a print worker, is carried out comfortably and optimized as to time, with the aid of the method according to the present invention. The individual curves 1*b*, corrected for printing length for the individual plate cylinders having the printing plates, are stored as correction parameters in the printing device and are implemented automatically in the print-free zone (region 2) in correction motions for the individual plate cylinders of the processing devices.

Figure 2:
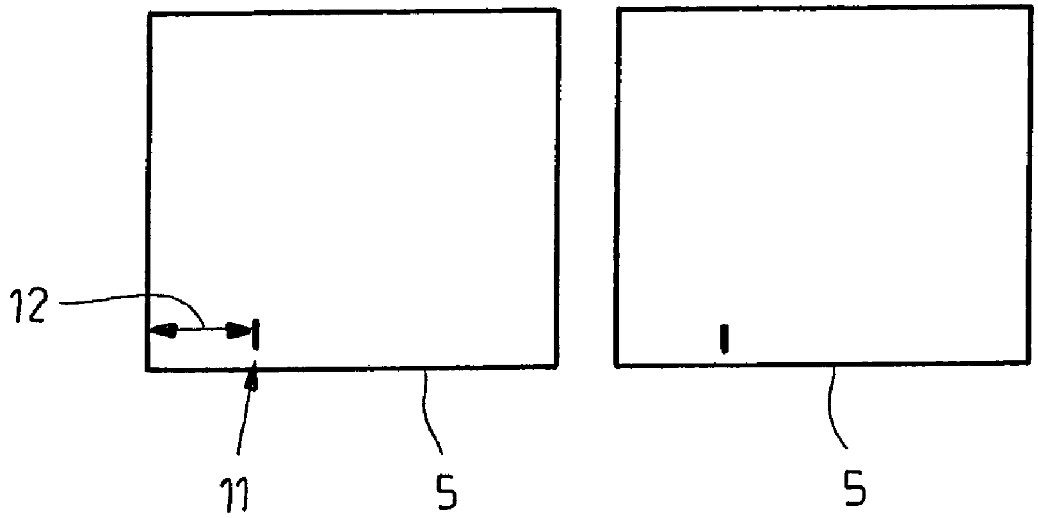
FIG. 2 shows two single printing products each having a printing mark.

FIG. 2 shows two individual printing product 5, on which in each case a single printing mark is situated at a specified distance from a sheet edge of printing product 5. The usual register controls use these individual printing marks as reference markings in order to align subsequent printing stations with the reference markings.

Figure 3:
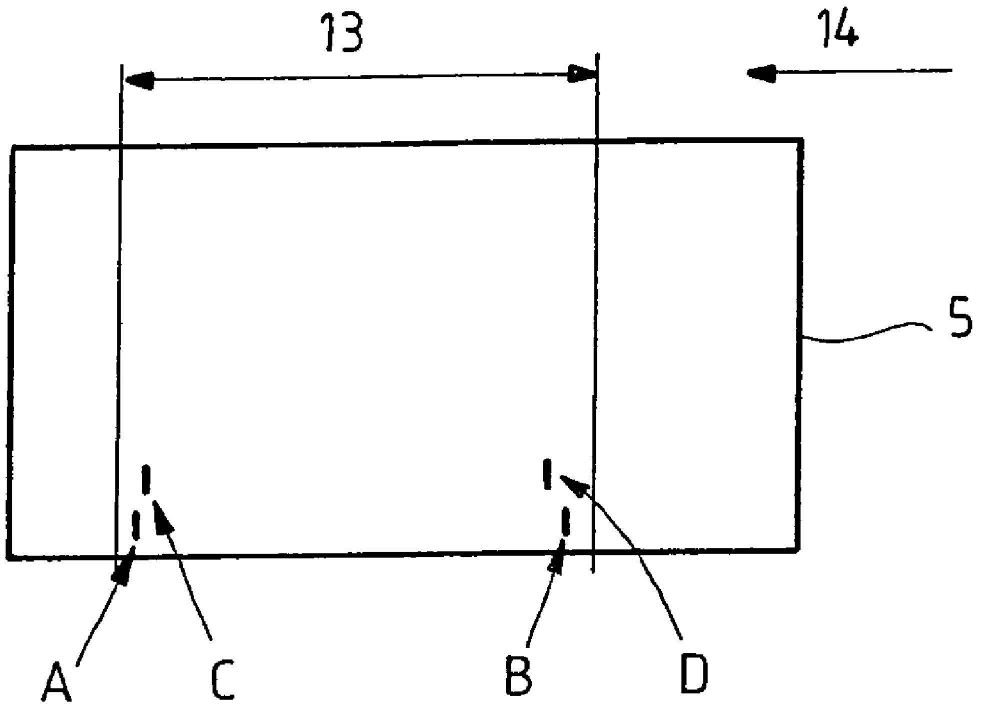
FIG. 3 shows a printing area of a printing product in which a first and a second processing device have each applied two printing marks, the application having been made without using the method according to the present invention.

FIG. 3 shows a printing area of a printing product 5. In the printing area, a first printing mark A has been applied by a first processing device and a second printing mark B has been applied by the first processing device. Furthermore, in the printing area, a first printing mark C has been applied by a second processing device and a second printing mark D has been applied by the second processing device. In common with printing marks A, B, C, D, printing images of the work stations may also have been applied. These printings are not shown in FIG. 3, for the sake of clarity. It may be seen that the first printing marks A, C of the two processing devices have different distances with respect to a front edge of the printing product 5, in the material flow direction. Moreover, it may be inferred from FIG. 3 that the second printing marks B, D have different distances with respect to a rear edge of printing product 5, in the material flow direction. The two printing marks A, B of the first processing device have a lesser distance from the edges of printing product 5 than the two printing marks C, D of the second processing device. From this it follows that the printing length of the first processing device is greater than the printing length of the second processing device. It may also be recognized that the two first marks in the material flow direction, A, C, of the first and of the second processing device, are situated in the area of a front edge of the printing area, and the two marks B, D of the two processing devices are situated in a rear area of the printing area. FIG. 3 shows a state of printing product 5 before the execution of the printing correction according to the present invention.

Figure 4:
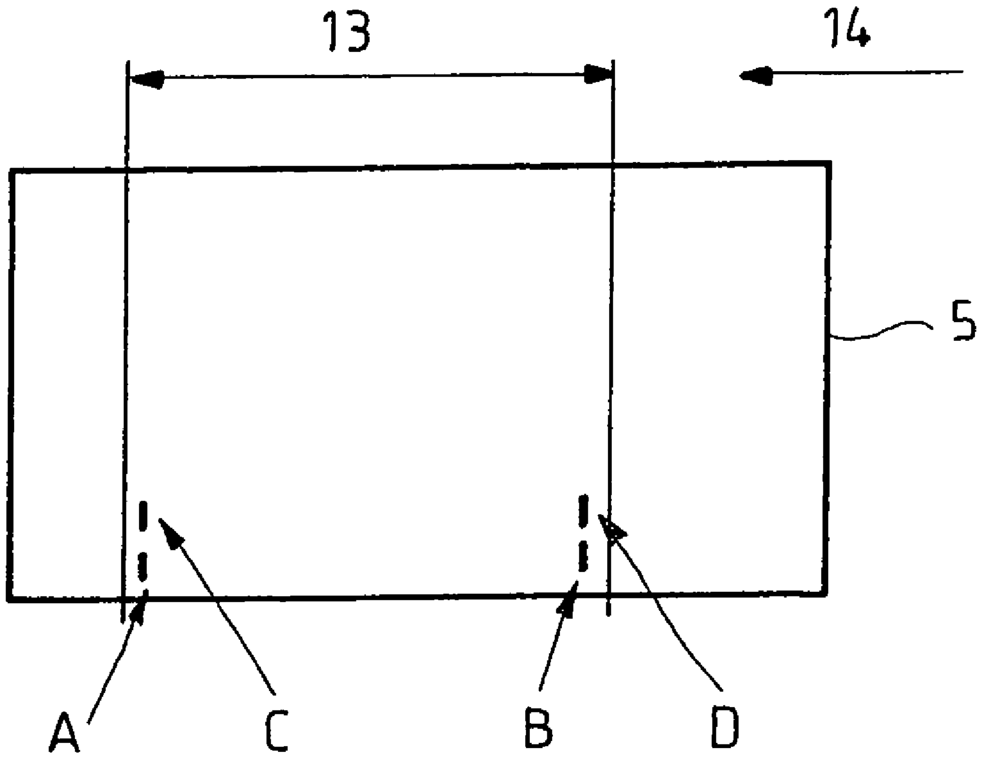
FIG. 4 shows a printing product on which the printing correction according to the present invention has been made.

FIG. 4 shows printing product 5 after a correction of the printing length carried out according to the present invention. It may be seen that first printing marks A, C of the first and second processing devices have essentially identical distances with respect to second printing marks B, D of the two processing devices. This means that the printing lengths of the two processing devices have been corrected according to the present invention, or that the printing length of the second processing device was adjusted to the printing length of the first processing device.

Consequently, in an advantageous manner, different printing lengths of the two processing devices are essentially equalized. The method according to the present invention carries out the printing correction in an automated manner, advantageously in that, in the printing area (area 1), a relative motion between the plate cylinder and the impression cylinder is executed as a result of different production master lengths. The different printing lengths of the individual plate cylinders are able to be equalized thereby.

It may further be seen in FIG. 4 that, using a preferred refinement of the present invention, a correction may be undertaken of the printing position. This means that the two first printing marks A, C are situated essentially identically with respect to the front edge of printing product 5. Stated more precisely, it may be seen that the two first printing marks A, C of the two processing devices are aligned in such a way that they have essentially identical distances from the front edge of the printing area of printing product 5. This corresponds to a position control for the two first printing marks A, C, using a printing device in the print-free zone (area 2).

In comparison to customary printing corrections, the method according to the present invention is thus distinguished by the fact that the correction is carried out in an automated fashion. This means that the manual determinations, described above, of the actual printing lengths and the subsequent manual adjustment may advantageously be omitted. The printing correction according to the present invention may thereby work more efficiently, to some extent, than the usual methods. The positions of the corrected printing marks C, D in FIG. 4 should only be seen as exemplary, so that any specifiable positions of the first and the second printing marks C, D of the second processing device are conceivable. Essentially, a fixed, specifiable position of the printing marks of the first and the second processing device with respect to one another is the result of the method according to the present invention. A control strategy is recognizable from FIG. 4, which is laid out in such a way that printing marks A, B, applied by the first processing device, are used to control subsequent processing devices.

Figure 5:
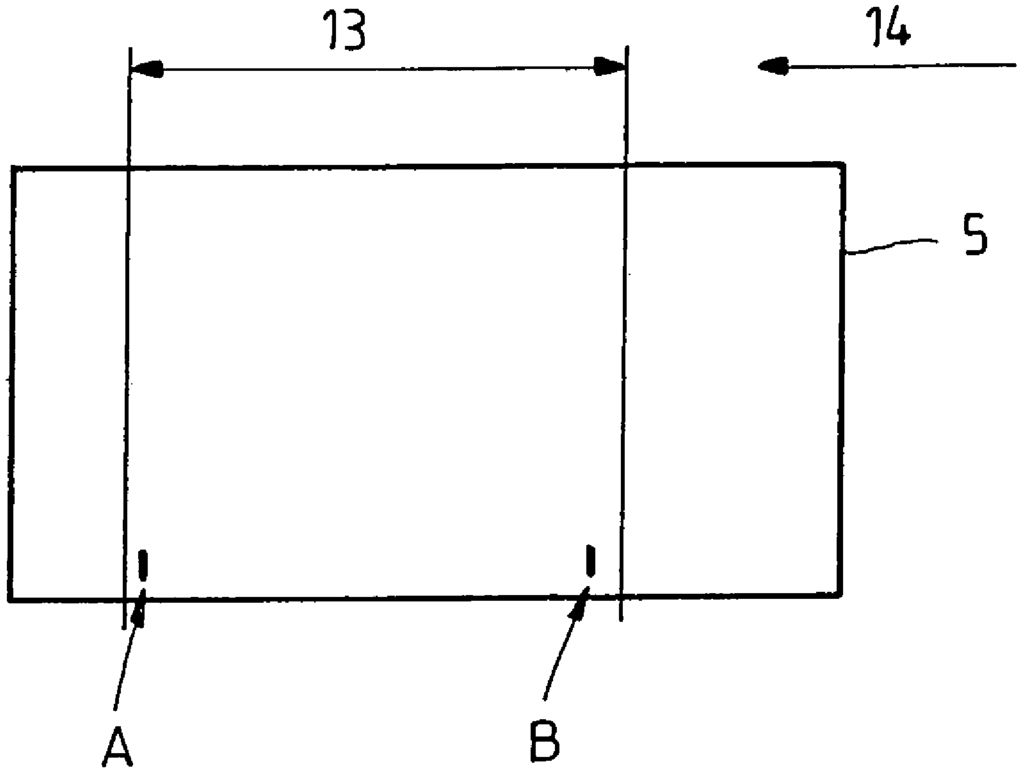
FIG. 5 shows a printing area of a printing product in which only the first processing device has applied two printing marks.

In the light of FIG. 5, an additional control strategy is explained, which is able to be implemented using a refinement of the method according to the present invention. Within the printing area of printing product 5, FIG. 5 shows two printing marks A, B which have been applied by the first processing device. However, it is also conceivable that the two printing marks A, B were already printed on before a processing procedure in the first processing device. In this case, printing product 5 is a material for printing on that is preprinted with two reference printing marks. The additional control strategy is distinguished in that the stations following the first processing device record the position of the first printing marks A, B of the first processing device, and adjust their printing steps with reference to printing marks A, B. Advantageously, what can be achieved thereby is that the processing devices following the first processing device are always aligned at a fixed angle to the first processing device. In this specific embodiment, therefore, what is involved is an adjustment mechanism which uses reference printing marks A, B to align the subsequent processing devices to them.

In the case of changing relationships of the printing marks of the first processing device A, B or the printing marks that were printed on ahead of time, the printing steps of the subsequent processing devices change along with them. Because of that, for example, in an advantageous manner a long-term drift of a relationship between the processing devices is able to be eliminated. A printing process having a plurality of processing devices may consequently be designed in a stable manner, in lasting fashion. In addition, the advantage therefore comes about that printing marks have only to be recorded as to position for a single printing color, which makes it possible to do without additional printing marks and recording devices, including their implicit inaccuracies. As a practical application example of the additional control variant, for instance, a rotary die-cutting machine is conceivable which die-cuts preprinted sheets having two register marks.

Up to this point, a control was described of printing lengths of a plurality of processing devices. However, with the aid of the method according to the present invention, one may also carry out an absolute measurement of the positions of the printing marks or the distance apart of the printing marks. Thereby absolute accuracy may be achieved for printing procedures. The measurement may be carried out, for example, using a calibrated camera which records absolute positions of the printing marks and in this way ascertains an absolute distance of the first from the second printing mark. Using this specific embodiment of the method according to the present invention, it is conceivable, for example, that an absolute printing length of the first processing device is recorded, to which the subsequent processing devices synchronize with respect to the printing length.

One specific embodiment of the method according to the present invention, as described above, permits an overall correction of a print in two partial steps. In a first partial step, in this context, the position of second printing marks B, D with respect to each other is controlled (printing length correction), and in a second partial step the position of first printing marks A, C with respect to each other is controlled (printing position correction). The partial steps described may also be carried out in the opposite sequence with respect to each other.

While using a suitable algorithm, it is also conceivable that the two partial steps described be unified into one single partial step. This makes it possible to carry out the overall connections described in a single step, in which, from printing product to printing product, both the printing length correction and the printing position correction are carried out in one single step. In one's mind one can imagine this as two partial steps that are connected to each other, the results of the first partial step being not influenced any more by the respective second step. In this context, the position of first printing marks A, B with respect to each other is no longer changed by the printing length correction of the second partial step.

Figure 6:
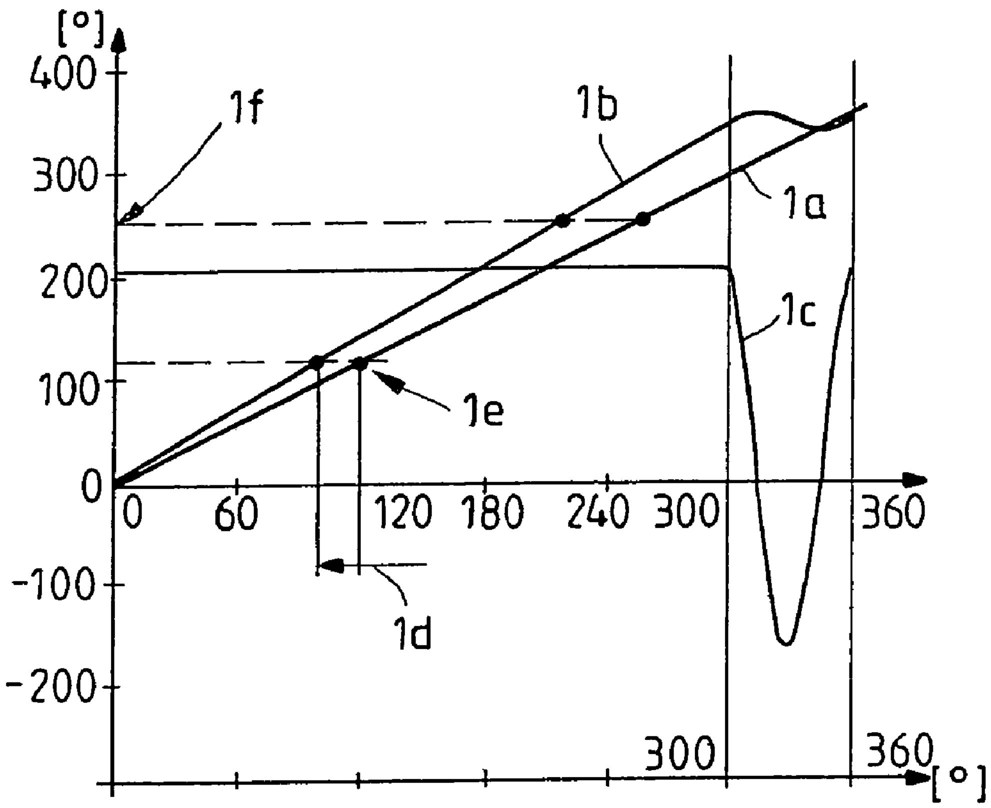
FIG. 6 shows a representation in principle of a shifting of printing marks as the result of a printing length correction.

The functioning of a correction just described is shown in a single step in the light of FIG. 6. In the case in which first printing mark A of the first processing device is not applied at 0°, but, as shown in FIG. 6, at 120°, a different slope of printing length-corrected curve 1*b* of the angle of the impression cylinder plotted against the plate cylinder generates a position change of first printing mark A.

This position shift as a result of a printing length change is shown in FIG. 6 by position shift 1*d*. It may be seen in FIG. 6 that, according to an intersect theorem-like principle, the position shift 1*d* is greater the farther away the first printing mark A is applied from the position 0°. An algorithm for carrying out the overall correction in a single partial step has to consider these circumstances.

It may be seen in FIG. 6 that it is more suitable to carry out the printing length correction, and only after that to carry out the printing position correction. This comes about from the fact that, after a printing length correction has been executed, the printing length has already been corrected, and is fixed, and by the use of the subsequent printing position correction it only still has to be shifted position-wise.

Figure 7:
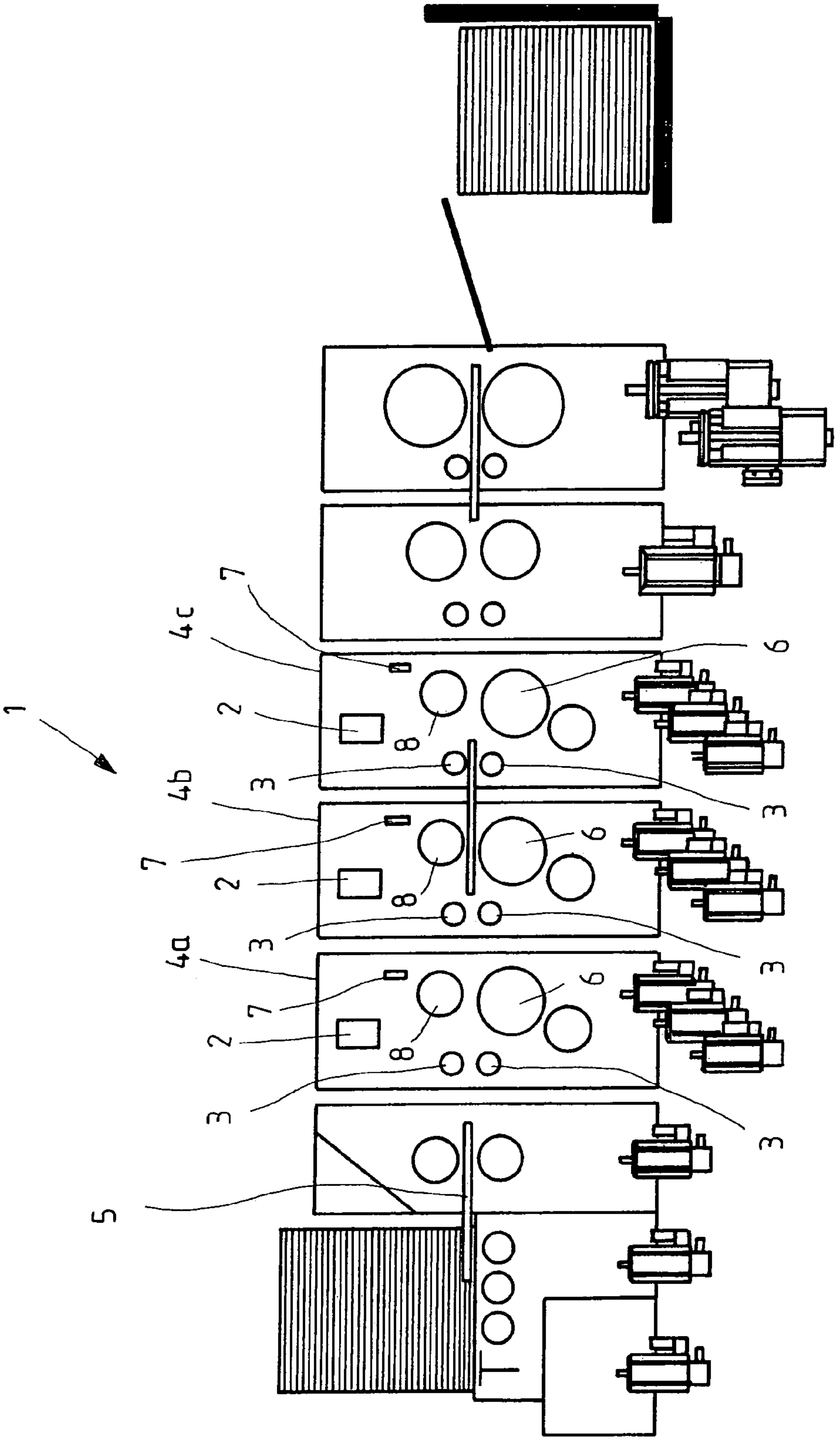
FIG. 7 shows a schematic representation of a device for carrying out the method according to the present invention.

FIG. 7 shows a apparatus 1 for printing correction, using which the method according to the present invention may be carried out. Apparatus 1 includes a plurality of processing devices 4*a*, 4*b*, 4*c* in which a printing product 5 is printed on in each case by a plate cylinder 6. With the aid of transportation devices 3, printing product 5 is transported by a processing device 4*a*, 4*b*, 4*c* to the next processing device 4*a*, 4*b*, 4*c*. A device 2 is used for recording and evaluating the positions of the printing marks on printing products 5.

Device 2 may be, for instance, a light barrier, a camera and a computing unit which are used for supplying ascertained correction data to processing devices 4*a*, 4*b*, 4*c*. Based on the correction data, processing device 4*a*, 4*b*, 4*c* is able variably to apply the printing marks onto printing products 5 according to position. Control outputs 7 of processing devices 4*a*, 4*b*, 4*c* detect a result of the printing correction according to the present invention, that is, they establish whether the result of the printing correction are printing length reductions or printing length extensions.

Both processing devices 4*a*, 4*b*, 4*c* and transportation device 3 may be used as actuators of the method according to the present invention. In the first case, the transportation of printing product 5 takes place with the aid of transportation device 3 using a largely constant speed, plate cylinders 6 of processing devices 4*a*, 4*b*, 4*c* executing a relative motion to printing product 5. In the second case, the transportation of printing product 5 takes place with the aid of transportation device 3 using a speed that is not constant. The result is that the transportation procedure of printing product 5 is corrected, which may be done, for instance, by the correction of a speed control for transportation device 3.

In an advantageous manner, there are two different possibilities for the selection of the correction elements, particularly in the case of single products, the product transportation being used as actuator as opposed to correction of processing device 4*a*, 4*b*, 4*c*. This also corresponds to a selection possibility in usual register corrections.

In the following, the sequence of the method according to the present invention in apparatus 1 for printing correction is described in principle. Printing product 5 is conveyed to first processing device 4*a* using transportation device 3. In first processing device 4*a* first printing mark A of first processing device 4*a* and second printing mark B of first processing device 4*a* are applied. In a further sequence, printing product 5 is conveyed to second processing device 4*b*, using transportation device 3. At that point, first printing mark C of second processing device 4*b* and second printing mark D of second processing device 4*b* are applied to printing product 5. Thereafter, printing product 5, along with applied printing marks A, B, C, D is conveyed to third processing device 4*c*, using transportation device 3. Device 2 for recording the positions of printing marks of third processing device 4*c* detects the positions of printing marks A, B, C, D on printing product 5, and evaluates the positions of printing marks A, B, C, D. If device 2 establishes that the distance of printing mark A to printing mark B deviates from the distance of printing mark C to printing mark D, this means that the actual printing lengths of first processing device 4*a* and second processing device 4*b* are different.

Thereupon, as a correcting measure, second processing device 4*b* is activated via a control output 7 of third processing device 4*c*. Because of this, for next printing product 5 that is conveyed to second processing device 4*b*, plate cylinder 6 is moved relative to printing product 5, using transportation device 3 or processing device 4*b*, in such a way that second processing device 4*b* produces an essentially identical printing length on printing product 5, in comparison to first processing device 4*a*. A parameter value for the correcting motion of second processing device 4*b* may be stored in second processing device 4*b*, so that, for all further printing products 5 during their processing, the printing correction according to the present invention is automatically carried out by second processing device 4*b*.

As a further development of the method according to the present invention, second processing device 4*b* can be activated, via control output 7 of third processing device 4*c*, in such a way that the position of first printing mark C is also adjusted to the position of first printing mark A of first processing device 4*a*. This has the favorable result that a printing position correction takes place in addition to a printing length correction.

It stands to reason that the correction method described is not limited to a correction of printing marks C, D only of second processing device 4*b*, but can be extended to a plurality of different processing devices 4*a*, 4*b*, 4*c*. However, to make it simpler, only the correction of printing marks C, D of second processing device 4*b* was described above.

As a further improving measure for carrying out the method according to the present invention, it is conceivable to perform an optimization of the extension of the flexographic printing plates with respect to one another. Thereby different production master lengths can be roughly adjusted even in the preliminary stages of the method according to the present invention, so that, when using the method according to the present invention, only a fine correction of the printing lengths still has to be performed. This may be achieved, for example, by taking a measurement of the pulling force when the printing plate is mounted on plate cylinder 6.

Furthermore, an optimization of an actuating algorithm in the case of a control/setting that affects the printing is conceivable. If a plurality of processing devices 4*a*, 4*b*, 4*c* are controlled with respect to one another, it may happen that some of the adjustments attained thereby represent printing length reductions and some represent printing length extensions. It is known, however, that printing length reductions are able to cause serious deteriorations in the printing image, as compared to printing length extensions. Therefore it is of advantage to design the method according to the present invention in such a way that, in principle, none or only small printing length reductions come about, that is, printing length reductions very limited in their size. This may be achieved in that, first of all, a print of a reference color is made without printing length extension or printing length reduction being made. After that, control outputs 7 processing devices 4*a*, 4*b*, 4*c* are checked for possible printing length reductions. If one or more printing unit are present having the resulting printing length reduction based on the printing control according to the present invention, the reference print is changed in such a way that no printing unit carries out a printing length reduction or only a maximum specifiable printing length reduction based on the control/setting. This may be attained, for example, in that the printing unit of the reference color is corrected by a suitable amount (printing length extension of the reference print).

Example:

Printing length changes of the processing devices (first change is the reference print).

Before: 0 mm, +1 mm, −2 mm, −3 mm, +1 mm.

After: +3 mm, +4 mm, +1 mm, 0 mm, +4 mm (there is no longer any printing length reduction).

The numbers give printing length changes of the individual processing devices 4*a*, 4*b*, 4*c* in millimeters, the first of the five numerical values represents a printing length change for the reference print. A positive sign means a printing length extension and a negative sign means a printing length reduction of a subsequent processing device 4*a*, 4*b*, 4*c*. Thus, before that application of the improved algorithm, a maximum printing length change includes a printing length reduction by 3 mm (Before: from 0 to −3 mm). After the application of the improved algorithm, the printing length change no longer includes any printing length reduction. (After: from +3 mm to +4 mm).

A modification of the algorithm may have the result that the reference print is changed in such a way that at least a reduction in absolute amount of the maximum print length reduction comes about in the machine.

Example:

Print length changes of the printing units (first change is reference print)

Before: 0 mm, +1 mm, +2 mm, −3 mm, +1 mm.

After: +1 mm, +2 mm, +3 mm, −2 mm, +2 mm (printing length reduction in absolute amount is a maximum of −2 mm).

From a comparison of the two rows of numbers for the correction values it may be seen that, after the application of the algorithm, a pressure length reduction still occurs, to be sure, but it is reduced in comparison with the case of the application without the algorithm. The reduction in the printing length reduction amounts to 1 mm (from −3 mm before to −2 mm after).

In the optimization of the algorithm described, advantageously the reference print is printed in such a way that print reductions in subsequent prints of subsequent processing device 4*a*, 4*b*, 4*c* no longer occur. An improvement in the printing image is thereby supported in an advantageous manner.

The method according to the present invention may be advantageously carried out, using various types of processing devices 4*a*, 4*b*, 4*c*. For example, a slotter, a punch or a cross cutter may be used as processing device 4*a*, 4*b*, 4*c*. In this context, a slotter is understood to mean a processing device 4*a*, 4*b*, 4*c* which insert longitudinal slits into printing product 5. A punch is understood to be a processing device 4*a*, 4*b*, 4*c* that executes all the remaining slits and cutting procedures in printing product 5, such as cross cuts, corrugated cuts or waste stripping. Cross cutters are understood to mean processing device 4*a*, 4*b*, 4*c* that cut in the transverse direction. Thus, although the present invention was explained in the above description in connection with printing units as processing device 4*a*, 4*b*, 4*c*, it goes without saying that the present invention may also be carried out as a method for a processing correction using a slotter, punches and cross cutters. This may favorably increase overall accuracy and overall reproducibility of an overall printing procedure in an efficient manner.

| List of Reference Numerals and Letters | |
|---|---|
| 1 | apparatus for printing correction |
| 1a | uncorrected printing curve |
| 1b | printing curve corrected for printing length |
| 1c | speed curve of a correction motion |
| 1d | position shift because of printing length change |
| 1e | position of first printing mark on plate cylinder |
| 1f | position of second printing mark on plate cylinder |
| 2 | device for recording and evaluating positions of printing marks |
| 3 | transportation device |
| 4a | first processing device |
| 4b | second processing device |
| 4c | third processing device |
| 5 | printing product |
| 6 | plate cylinder |
| 7 | controller output |
| 8 | impression cylinder |
| 9 | area 1 |
| 10 | area 2 |
| 11 | printing mark of processing device |
| 12 | distance of printing mark from edge of sheet |

-continued

| List of Reference Numerals and Letters | |
|---|---|
| 13 | printing area |
| 14 | material flow |
| A | first printing mark of first processing device |
| B | second printing mark of first processing device |
| C | first printing mark of second processing device |
| D | second printing mark of second processing device |

What is claimed is:

1. A method for carrying out a printing correction, comprising:

printing on a product by a plurality of processing devices during a processing procedure having the following method steps:

recording positions of at least two printing marks situated on the product;

evaluating the positions; and correcting the print in an automated way based on the positions of the printing marks, the correcting including a correcting of a printing length, wherein at least one printing mark is situated in a front area of the product in a direction of transportation, and at least one second printing mark is situated in a rear area of the product in the direction of transportation.

2. The method as recited in claim 1, wherein the automated correction of the print additionally includes the correcting of a printing position.

3. The method as recited in claim 1, wherein two printing marks are applied on the product by two processing devices, a first printing mark being applied by a first processing device; and a second printing mark being applied by a second processing device.

4. The method as recited in claim 3, wherein, with the aid of the printing mark applied by the first processing device, additional processing devices are controlled during the processing procedure in such a way that the printing marks are applied onto the product in a fixed position to each other.

5. The method as recited in claim 3, wherein the positions of the first printing marks with respect to each other and the positions of the second printing marks with respect to each other are regulated.

6. The method as recited in claim 1, wherein only a first processing device applies the two printing marks during the processing procedure.

7. The method as recited in claim 6, wherein the processing devices that follow the first processing device in the processing procedure are set with the aid of the applied printing marks.

8. The method as recited in claim 1, wherein, based on the printing marks, absolute printing lengths are ascertained for the individual processing devices.

9. The method as recited in claim 1, wherein the position as to location of the printing marks on the product is variable.

10. A method for carrying out a printing correction, comprising:

printing a product by a plurality of processing devices during a processing procedure having the following method steps:

applying a reference print to the product by the first processing device;

checking controller outputs of the processing devices for possible printing length reductions; and changing the reference print in response to the presence of a print length reduction, so that exclusively printing length extensions result as the printing length corrections for subsequent processing devices.

11. The method as recited in claim 10, wherein the changing of the reference print is designed in such a way that the printing length reductions resulting from the printing length corrections are able to be limited in their absolute amount.

12. An apparatus for printing control, comprising:

a device for recording positions of at least two printing marks on a product, at least one first printing mark being situated in a front area of the product in a direction of transportation and at least one second printing mark being situated in a rear area of the product in the direction of transportation; and a correcting device for performing an automated correction of a print; the automated correction including the correction of a printing length.

13. The device as recited in claim 12, wherein the automated correction of the print is executable using the correcting device, the automated correction additionally including a correction of a printing position.

14. The device as recited in claim 12, wherein:

the correcting device includes at least one of a transportation device and a processing device.

* * * * *